July 13, 1954  E. S. NEAL  2,683,428
ROLLING PIN
Filed April 3, 1952  2 Sheets-Sheet 1
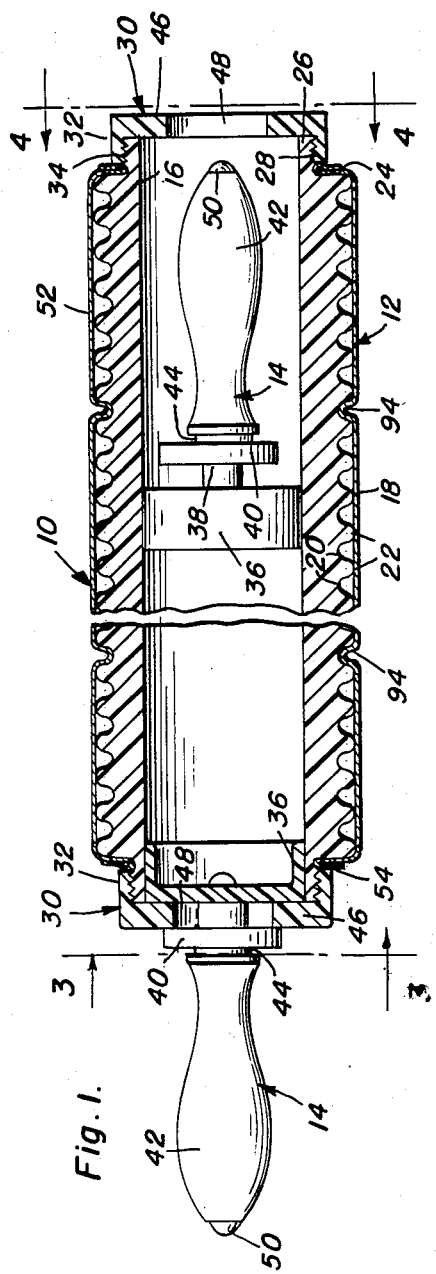
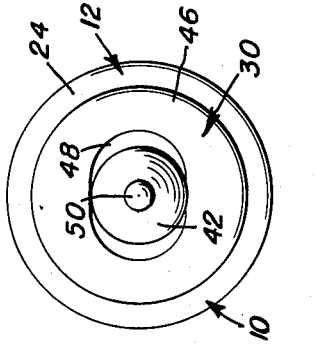
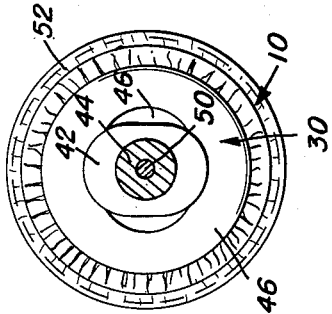
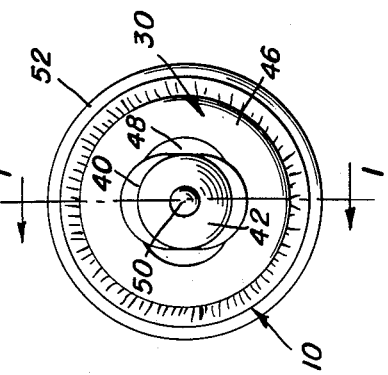
Earl S. Neal
INVENTOR.

July 13, 1954  E. S. NEAL  2,683,428
ROLLING PIN
Filed April 3, 1952  2 Sheets-Sheet 2
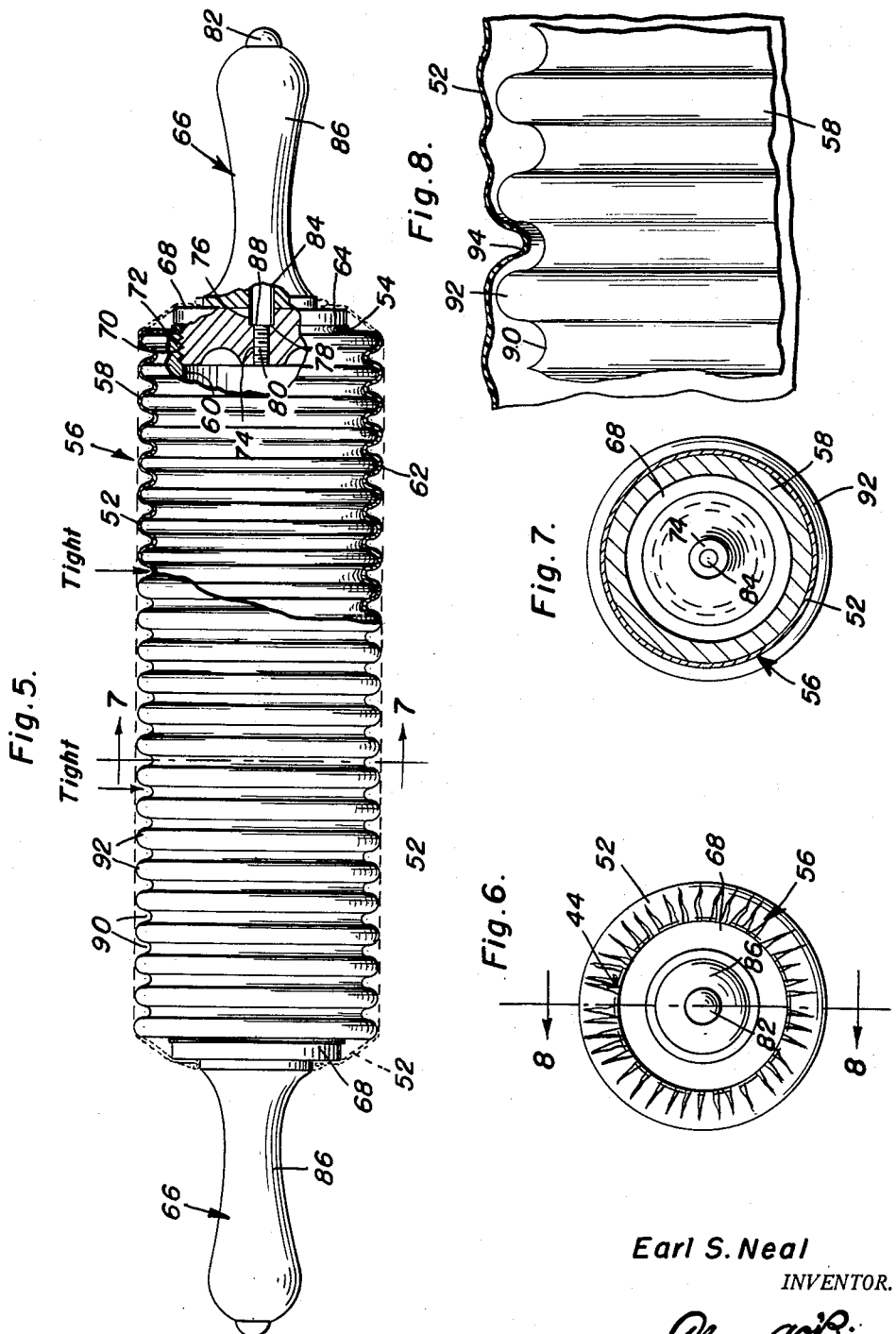
Earl S. Neal
INVENTOR.

Patented July 13, 1954

2,683,428

UNITED STATES PATENT OFFICE 2,683,428

ROLLING PIN

Earl S. Neal, San Mateo, Calif.

Application April 3, 1952, Serial No. 280,345

11 Claims. (Cl. 107—50)

This invention relates in general to a culinary apparatus, and more particularly to a combination rolling pin for rolling and kneading dough.

The primary object of this invention is to provide an improved rolling pin having a surface which will simultaneously knead dough and rolling the same out into an enlarged sheet.

Another object of this invention is to provide an improved rolling pin having a circumferentially corrugated exterior surface which is enclosed within a flexible plastic tubing normally loosely disposed thereon in order that it may conform to the corrugated configuration of the rolling pin due to the pressure of dough exerted thereon during the rolling and kneading of the same.

Another object of this invention is to provide a rolling pin which will produce a lightly kneaded unpacked dough that in a baking process permits the shortening and other ingredients a maximum of expansion in order to produce a fluffy pastry such as pie crusts, in contradiction to the packing action of smooth rolling pins.

Another object of this invention is to provide a rolling pin which includes a covering sleeve adapted for engagement with dough to be rolled, said covering sleeve not coming into contact with an operator's hands in the ordinary operation of the rolling pin.

Another object of this invention is to provide an improved rolling pin having a corrugated exterior surface, said rolling pin being provided with a flexible plastic tubing in the form of a cover for the body portion thereof, said cover being adapted to be positioned either loosely on the body portion of the rolling pin in order to conform to the external configuration thereof, or to be tightly disposed upon the rolling pin so as to provide a smooth cylindrical surface whereby a corrugated surface of a sheet of dough rolled out with the rolling pin may be lightly rolled in order to smooth the same.

Another object of this invention is to provide an improved rolling pin having a substantially cylindrical body portion which has an exterior provided with circumferential corrugations, said circumferential corrugations being formed in a simple machining operation whereby a corrugated rolling pin may be formed as cheaply as a smooth rolling pin.

Another object of this invention is to provide an improved rolling pin including a cylindrical body portion having handles mounted in each end thereof, said handles being adapted to be telescoped entirely within the body portion in order to reduce the over-all length of the rolling pin.

A further object of this invention is to provide an improved rolling pin having a flexible plastic cover mounted thereon and enclosing the body portion thereof in order that the sticking of the dough to the rolling pin is eliminated due to the smooth surface of the plastic covering.

With these objects definitely in view, this invention resides in certain novel features of construction, combination and arrangement of elements and portions as will be hereinafter described in detail in the specification, particularly pointed out in the accompanying drawings which form a material part of this application, and in which:

Figure 1 is a longitudinal vertical sectional view of the rolling pin which is the subject of this invention and taken substantially upon the plane indicated by the section line 1—1 of Figure 2, the rolling pin having a cylindrical body portion in which is disposed one of the handles, the plastic tubing covering the body portion of the rolling pin being loosely disposed thereon;

Figure 2 is an end elevational view of the rolling pin of Figure 1 and showing the general arrangement of the handle mounted thereon;

Figure 3 is a transverse vertical sectional view taken substantially on the plane indicated by the section line 3—3 of Figure 1 and shows the general arrangement whereby the handle may be twisted and telescoped within the body portion of the rolling pin;

Figure 4 is an end elevational view of the rolling pin of Figure 1 taken substantially upon the plane indicated by the line 4—4 thereof, the flexible plastic covering normally enclosing the body portion of the rolling pin being omitted;

Figure 5 is a side elevational view of another form of rolling pin, the rolling pin being similar to the rolling pin of Figure 1 and having a modified handle construction, the flexible plastic tubing being illustrated in a position conforming to the general configuration of the exterior of the body portion of the rolling pin, a portion of the plastic tubing being broken away and shown in section in order to clearly illustrate the relationship between the tubing and the corrugated exterior of the body portion, a portion of the body portion of the rolling pin being broken away at one end thereof in order to illustrate the manner in which one handle is secured thereto, the plastic covering being illustrated in a tensioned position by dotted lines;

Figure 6 is an end elevational view of the rolling pin of Figure 5;

Figure 7 is a transverse vertical sectional view taken substantially upon the plane indicated by the section line 7—7 of Figure 5 and showing the general internal construction of the rolling pin; and Figure 8 is an enlarged fragmentary view of the upper portion of the rolling pin of Figure 5, the transparent plastic tubing being broken away and shown in section in order to clearly illustrate the relationship of the plastic tubing in a loose state with respect to the exterior surface of the body portion of the rolling pin.

Similar characters of reference designate similar or identical elements and portions throughout the specification and throughout the different views of the drawings.

Referring now to the drawings in detail, it will be seen that there is illustrated in Figures 1 through 4, a preferred modification of this invention. The rolling pin illustrated in Figures 1 through 4 is referred to in general by the reference numeral 10 and includes a body portion 12 and a pair of handles referred to in general by the reference numeral 14 carried at the ends of the body portion 12.

The body portion 12 is in the form of a cylindrical member having a bore 16 therethrough and a corrugated exterior surface 18. The corrugated exterior surface 18 has corrugations extending circumferentially around the body portion 12 and includes grooves 20 and crests 22 in alternate relation. The ends of the body portion 12 are reduced to form annular shoulders 24 on the ends thereof and a reduced portion 26 projecting from the ends. The reduced portions 26 are externally threaded as at 28 and have threadedly engaged thereon cap members 30. The cap members 30 have cylindrical portions 32 which are internally threaded as at 34 to engage with the externally threaded portion 28 of the reduced portions 26. The free edge of the cylindrical portion 32 of each cap 30 is disposed in spaced relation from the annular shoulder 24 at its respective end of the body portion 12.

Each handle portion 14 includes a cylindrical guide and bearing element 36 of a diameter substantially equal to the diameter of the bore 16 through the body portion 12. Integral with the guide and bearing element 36 is a shaft element 38 connecting an oval shoulder element 40 to the guide and bearing element 36. A grip element 42 is connected to the shoulder element 40 by a reduced section 44 so as to provide a shoulder on the inner end of the grip element 42 closely spaced from the shoulder 40.

As is best illustrated on the left side of Figure 1, the length of the shaft element 38 is equal to the thickness of the cap portion 46 of its associated cap 30 and the handle portion 14 is mounted in its operating position with the cap portion 46 disposed between the cylindrical guide and bearing element 36 and the shoulder 40. This is accomplished by providing the cap portion 46 of each cap member 30 with an oval opening 48 therethrough of a size to pass the oval shoulder 40 of the handle member 14. The handle portion 14 is retained in its extended position by twisting the shoulder element 40 to a position whereby its longitudinal axis extends transversely of the longitudinal axis of the opening 48, as is best illustrated in Figures 2 and 3.

As is best illustrated in Figure 1, the cylindrical guide and bearing element 36 is generally C-shaped in cross section and is connected to the grip element 42 and the other elements of the handle portion 14 by an elongated fastener 50. The grip element 42 of each handle portion 14 is mounted upon the elongated fastener 50 for rotation with respect thereto in order that the body portion 12 may be conveniently moved along a surface and rotated without the grip portion 42 being rotated. It will be understood that the relationship of the body portion 12 to the handle portions 14 is such that both handle portions 14 may be completely telescoped within the bore 16 of the body portion 12 in order that the rolling pin 10 may be conveniently stored.

Due to the circumferentially corrugated exterior configuration of the body portion 12, the rolling pin 10 may be utilized to knead dough simultaneously with the rolling of same into a flat sheet. The kneading action is due to the cutting of the dough by the corrugations and stretching the same as it is being rolled. In order that the dough will not stick to the corrugated surface of the body portion 12, it is enclosed within a flexible plastic tube 52 which is provided at its ends with elastic means 54 for tightly engaging an object. Inasmuch as the flexible plastic tube 52 is also utilized with the modified rolling pin of Figures 5 through 8, the specific construction thereof will be explained in more detail hereinafter.

Referring now to Figures 5 through 8, it will be seen that there is illustrated a modified form of rolling pin which is referred to in general by the reference numeral 56. The rolling pin 56 includes a cylindrical body portion 58 which has a longitudinal circular bore 60 therethrough and has a circumferentially corrugated external surface 62.

Carried by each end of the body portion 58 is a handle 66 which includes a base portion 68 which is externally threaded on the inner end thereof as at 70. The threaded portion 70 of the base portion 68 is threadedly engaged with internal threads 72 in the wall of the body portion 62 forming the bore 60 at each end thereof.

The base portion 68 is provided with a centrally located bore which includes an internally threaded inner portion 74 and an enlarged outer portion 76 forming an annular shoulder 78 between the two portions of the bore. Threadedly engaged in the threaded portion 74 is a threaded reduced end portion 80 of an elongated fastener 82. The elongated fastener 82 passes through a central bore 84 in a grip member 86 and secures the same to the base portion 68. However, the elongated fastener 82 is provided with a shoulder portion 88 adjacent the threaded end thereof which engages with the shoulder 78 of the base portion 68 and thereby permits the freely rotating mounting of the grip member 86 thereon. It will be noted that the base portion 68 is so formed to provide an annular groove 64 therein adjacent the end of the body portion 58.

The body portion 58 of the rolling pin 56 is also provided with a flexible plastic tube 52 for preventing dough from sticking to the corrugated exterior surface 62. The plastic tube 52 has the ends thereof disposed within the annular groove 64 of the base portion 68 and secured therein by the elastic 54.

It will be understood that although the plastic tube 52 has a diameter substantially equal to the diameter of the body portions of the rolling pins 10 and 56, it has a length which is greater than the length of the respective body portions of the rolling pins so as to loosely fit upon the body portions when the ends thereof are disposed in either the annular groove 64 or in the groove formed between the shoulder 24 and the end of the cylindrical portion 32 of the cap member 30. This relationship between the plastic tube 52 and the body portion 58 of the rolling pin 56 is best illustrated in Figure 8. It will be understood that the body portion 58 is also provided with grooves 90 and crests 92 which form the corrugated exterior surface 62.

When the plastic tube 52 is disposed loosely upon the body portions of the rolling pins 10 and 56, the length of the same is such that when the rolling pins are utilized for rolling and kneading of dough the flexible plastic tube 52 is pressed into the grooves 20 and 90 of the body portions of the rolling pins 10 and 56, respectively, as is best illustrated in Figure 5 with respect to the rolling pin 56. During the normal rolling and kneading operation, the plastic tube 52 has the tendency to move toward one end of its respective rolling pin with the result that the portion of the plastic tube at the other end thereof would have a tendency to be placed under tension. In order to eliminate the longitudinal movement of the central portion of the plastic tube 52, it is provided at spaced intervals with areas of reduced diameters, the areas being referred to in general by the reference numeral 94. These areas of reduced diameters 94 each has a diameter normally less than the outer diameter of the respective body portion on which it is disposed and is received in one of the grooves formed in the exterior surface thereof. The area of reduced diameter 94 is prevented from moving longitudinally of the rolling pin on which it is mounted by an adjacent crest of the corrugated exterior.

After dough has been rolled and kneaded with the rolling pins 10 and 56 to the desired size and consistency, it is obvious that the top surface of the dough is corrugated and undesirable for use in making pastries under ordinary conditions. It is, therefore, necessary that the corrugations be rolled from the dough prior to the use thereof. Since it is undesirable to require the use of an additional rolling pin for this purpose, the rolling pin 10 has the reduced section 44 in each handle portion 14 provided for the express purpose of receiving the elastic ends 54 of the plastic tube 52 and retaining the same due to the size of the shoulder element 40. When the elastic ends 54 of the plastic tube 52 are positioned within the reduced sections 44 of the handle portions 14, the plastic tube 52 is longitudinally tensioned to form a cylindrical surface. The dough may then be rolled by exerting very light pressure thereon and the corrugations removed therefrom.

The rolling pin 56 has each handle 66 provided with the associated base portions 68 of a larger diameter in order to provide a shoulder behind which the elastic ends 54 of the tube 52 disposed thereon may be secured in order to tension the same. The plastic tube 52 is illustrated in a tensioned position by dotted lines.

In view of the foregoing, it is readily apparent that the combined kneading and rolling pin, which is the subject of this invention, provides a dual operation which is normally attainable only through the use of two separate culinary devices. When the plastic tube 52 is loosely disposed upon one of the rolling pins, the rolling pin becomes a combined rolling and kneading pin, but produces a sheet of dough which has an undesirable configuration. However, as mentioned above, the surface of the flattened dough may be smoothed by tensioning the plastic tube 52 and forming a smooth rolling surface.

The operation of this device will be understood from the foregoing description of the details thereof, taken in connection with the above recited objects and drawings. Further description would appear to be unnecessary.

Minor modifications of the device, varying in minor details and described here, may be resorted to without departure from the spirit and scope of the invention, as defined in the appended claims.

Having described the invention, what is claimed as new is:

1. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing.

2. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, said plastic tubing normally loosely fitting said cylindrical body and adapted to conform to the general contour of said circumferentially corrugated exterior, said tubing being adapted for engaging dough in order to simultaneously knead and roll same.

3. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, said plastic tubing being adapted to be tightly stretched on said cylindrical body whereby corrugations formed in a sheet of dough may be flattened.

4. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, said plastic tubing normally loosely engaging over said cylindrical body and conforming to the contour of the corrugated exterior surface to both roll and knead dough, said dough being kneaded by the formation of corrugations.

5. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, said plastic tubing normally loosely engaging over said cylindrical body and conforming to the contour of the corrugated exterior surface to both roll and knead dough, said dough being kneaded by the formation of corrugations, said plastic tubing being adapted to be tightly stretched on said cylindrical body whereby corrugations formed in a sheet of dough may be flattened.

6. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, the end portions of said apparatus including handles projecting outwardly from said body portion, said handles being rotatably mounted with respect to said cylindrical body portion.

7. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, the end portions of said apparatus including handles projecting outwardly from said body portion, said handles in combination with said body portion forming shoulders behind which the ends of said plastic tubing are normally secured with the tubing in a loose state.

8. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, the end portions of said apparatus including handles projecting outwardly from said body portion, said handles being rotatably mounted with respect to said cylindrical body portion, said handles being removably secured to said body portion.

9. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, the end portions of said apparatus including handles projecting outwardly from said body portion, said handles being rotatably mounted with respect to said cylindrical body portion, said handles being adapted to be telescoped within said cylindrical body portion.

10. A pastry rolling and kneading apparatus comprising an elongated cylindrical body having a circumferentially corrugated external surface, a cover of flexible plastic tubing disposed over said cylindrical body, the ends of said plastic tubing tightly engaging end portions of said apparatus, said plastic tubing having at least one portion of an internal diameter smaller than the external diameter of said body, said one portion nesting between adjacent corrugations of said corrugated exterior to prevent longitudinal sliding of said plastic tubing, the end portions of said body portion having handles projecting outwardly therefrom, said handles having shoulders adapted to have engaged therebehind the ends of said flexible plastic tubing for stretching same.

11. For use with a circular cross sectional rolling pin having at least one circumferential groove in its outer surface, a removable cover, said cover being tubular and formed of a smooth surface flexible material, said cover having at least one portion of reduced internal diameter for internesting coaction with the groove in the rolling pin.

References Cited in the file of this patent

UNITED STATES PATENTS

| Number | Name | Date |
|---|---|---|
| 29,006 | Rice et al. | July 3, 1860 |
| 745,923 | Stanley | Dec. 1, 1903 |
| 1,496,692 | Voss | June 3, 1924 |
| 1,807,009 | Pinnelli | May 26, 1931 |
| 2,035,384 | Hinchliff | Mar. 24, 1936 |
| 2,070,199 | Dixon | Feb. 9, 1937 |
| 2,078,839 | Conant et al. | Apr. 27, 1937 |
| 2,139,825 | Hunt | Dec. 13, 1938 |
| 2,524,705 | Huseby | Oct. 3, 1950 |

FOREIGN PATENTS

| Number | Country | Date |
|---|---|---|
| 6,305 of 1891 | Great Britain | Apr. 13, 1891 |